United States Patent [19]
Kojima

[11] Patent Number: 5,882,074
[45] Date of Patent: Mar. 16, 1999

[54] WALK-IN APPARATUS FOR A VEHICLE SEAT

[75] Inventor: Yasuhiro Kojima, Chiryu, Japan

[73] Assignee: Aisin Seiki Kabushiki Kaisha, Japan

[21] Appl. No.: 901,530

[22] Filed: Jul. 28, 1997

[30] Foreign Application Priority Data

Jul. 31, 1996 [JP] Japan .................................. 8-202289

[51] Int. Cl.[6] .................................................. B60N 2/12
[52] U.S. Cl. ...................... 297/341; 297/344.1; 248/429; 248/430
[58] Field of Search ................................ 297/341, 344.1, 297/317, 318; 248/429, 430

[56] References Cited

U.S. PATENT DOCUMENTS

| | | | |
|---|---|---|---|
| 4,775,126 | 10/1988 | Yokoyama | 248/430 |
| 5,020,762 | 6/1991 | Hatta | 248/429 X |
| 5,573,219 | 11/1996 | Chinomi | 248/429 X |
| 5,740,999 | 4/1998 | Yamada | 297/341 X |

FOREIGN PATENT DOCUMENTS 8-20266  1/1996  Japan .

*Primary Examiner*—Peter M. Cuomo
*Assistant Examiner*—Rodney B. White
*Attorney, Agent, or Firm*—Finnegan, Henderson, Farabow, Garrett & Dunner, L.L.P.

[57] ABSTRACT

A vehicle seat is forwardly and rearwardly slidably supported on a vehicle floor and includes a seat cushion and a seat back which is forwardly and rearwardly rotatably supported on the seat cushion. A walk-in apparatus for the vehicle seat includes a pair of locking plates arranged on opposite sides of the vehicle seat and restrict the sliding movement of the vehicle seat, a pair of reclining plates arranged on opposite sides of the vehicle seat and rotated by the forward rotating movement of the seat back, a pair of lever members arranged on opposite sides of the vehicle seat and connected to the locking plates and the reclining plates, a connecting member connected to each of the lever members so as to be integrally moved, and one memory plate engaged and disengaged with only one of the lever members.

4 Claims, 8 Drawing Sheets

15,882,074

WALK-IN APPARATUS FOR A VEHICLE SEAT

FIELD OF THE INVENTION

The present invention generally relates to a walk-in apparatus which is convenient for use in two-door cars having front and rear seats and provides on adequate opening by folding a seat back of the front seat forwardly and moving the front seat in a forward direction for easy entry or walk-in.

BACKGROUND OF THE INVENTION

An example of a walk-in apparatus for a vehicle seat is disclosed in Japanese Patent laid-open publication No. 8-20266.

The vehicle seat is slidably supported on the vehicle floor through a rail mechanism. The rail mechanism has a pair of lower rails which is secured on the vehicle floor and a pair of upper rails which is slidably supported on the lower rails. The vehicle seat has a seat cushion which is secured to the upper rails of the rail mechanism and a seat back which is rotatably supported on the upper rails of the rail mechanism.

The walk-in apparatus includes a pair of locking plates, a pair of reclining plates, a pair of lever members and a pair of memory plates. The locking plates are arranged on the opposite sides of the vehicle seat. The locking plates are rotatably supported on the upper rails which are secured to the vehicle seat and engage and disengage with the lower rails which are secured on the vehicle floor so as to restrict and achieve the sliding movement of a vehicle seat. The reclining plates are arranged on opposite sides of the vehicle seat and rotated by the forward rotating movement of the seat back. The lever members are arranged on opposite sides of the vehicle seat and connected to the locking plates and the reclining plates. The memory plates are arranged on the opposite side of the vehicle seat and engage and disengage with the lever members.

When the reclining plates rotate by the forward rotating movement of the seat back, the locking plates are moved through the lever members so as to be disengaged from the lower rails of the rail mechanism. Therefore, the sliding movement of the vehicle seat is achieved. As a result, the vehicle seat slides forwardly and provides an adequate opening. When the locking plates disengage, the memory plates are engaged with the lever members, therefore, the locking plates are disengaged from the lower rails until the vehicle seat is returned to an original position before the seat slides forward.

However, the walk-in apparatus needs a pair of memory plates which are arranged on the opposite sides of the vehicle seat. The locking plates may not operate synchronously if the two memory plates do not engage with the lever members at the same time or if the locking plates do not disengage from the lower rails at the same time.

SUMMARY OF THE INVENTION

A need exists, therefore, for a walk-in apparatus which addresses at least the forgoing drawbacks of the prior art.

According to the present invention, the walk-in apparatus for a vehicle seat which is forwardly and rearwardly slidably supported on a vehicle floor and includes a seat cushion and a seat back which is forwardly and rearwardly rotatably supported on the seat cushion includes a pair of locking plates arranged on opposite sides of the vehicle seat and restricting the sliding movement of the vehicle seat, a pair of reclining plates arranged on opposite sides of the vehicle seat and rotated by the forward rotating movement of the seat back, a pair of lever members arranged on opposite sides of the vehicle seat and connected to the locking plates and the reclining plates, a connecting member connected to each of the lever members so as to be integrally moved, and one memory plate engaging and disengaging with only one of the lever members.

BRIEF DESCRIPTION OF THE DRAWING FIGURES

The foregoing and additional features of the present invention will become more apparent from the following detailed description of the preferred embodiment thereof when considered with reference to the attached drawings, in which FIG. 1 is a plan view of a vehicle seat according to the present invention;

DETAILED DESCRIPTION OF THE PREFERRED EMBODIMENT

Hereinafter a walk-in apparatus according to a preferred embodiment of the present invention is explained with reference to FIGS. 1–7.

Figure 1:
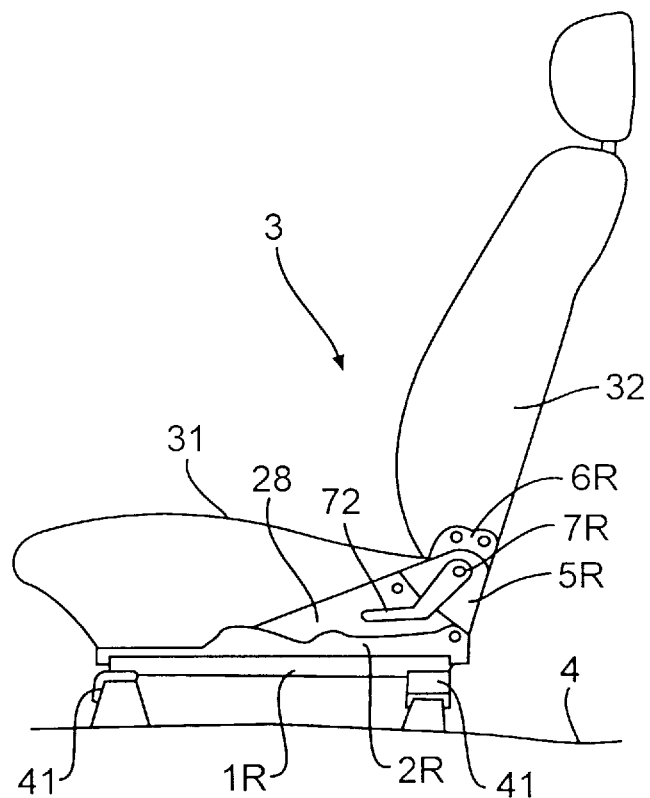
Figure 2:
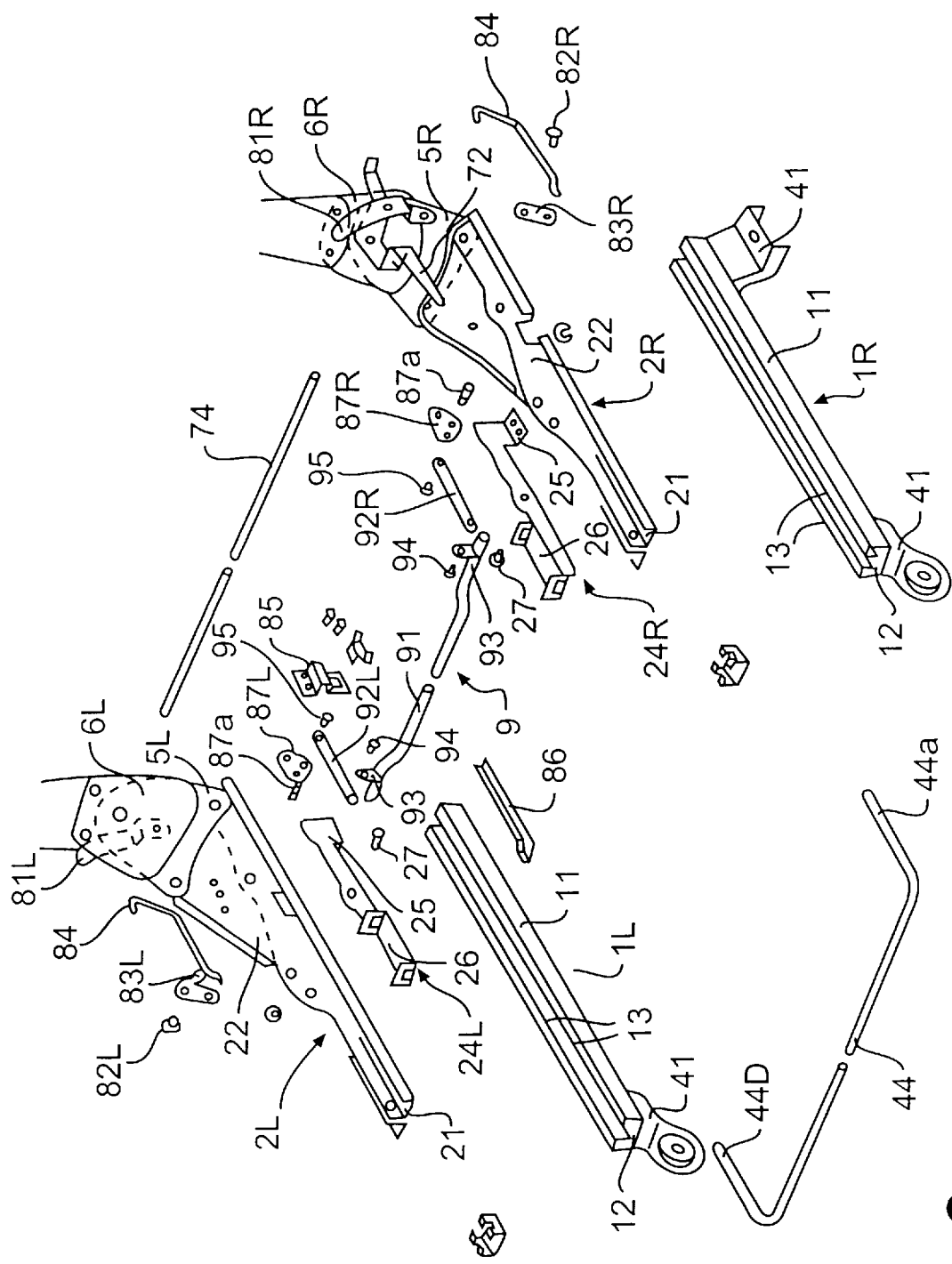
FIG. 2 is an exploded perspective view of a sliding mechanism according to the present invention.

As shown in FIGS. 1 and 2, a front seat 3 is forwardly and rearwardly slidably supported on a vehicle floor 4 through a pair of lower rails 1L, 1R and a pair of upper rails 2L, 2R. The lower rails 1L,1R are secured on the vehicle floor 4 through brackets 41. The front seat 3 has a seat cushion 31 and a seat back 32. The seat cushion 31 is secured to the upper rails 2L,2R. The seat back 32 is forwardly and rearwardly rotatably supported on the upper rails 2L,2R through a pair of lower arms 5L,5R and a pair of upper arms 6L,6R.

Figure 3:
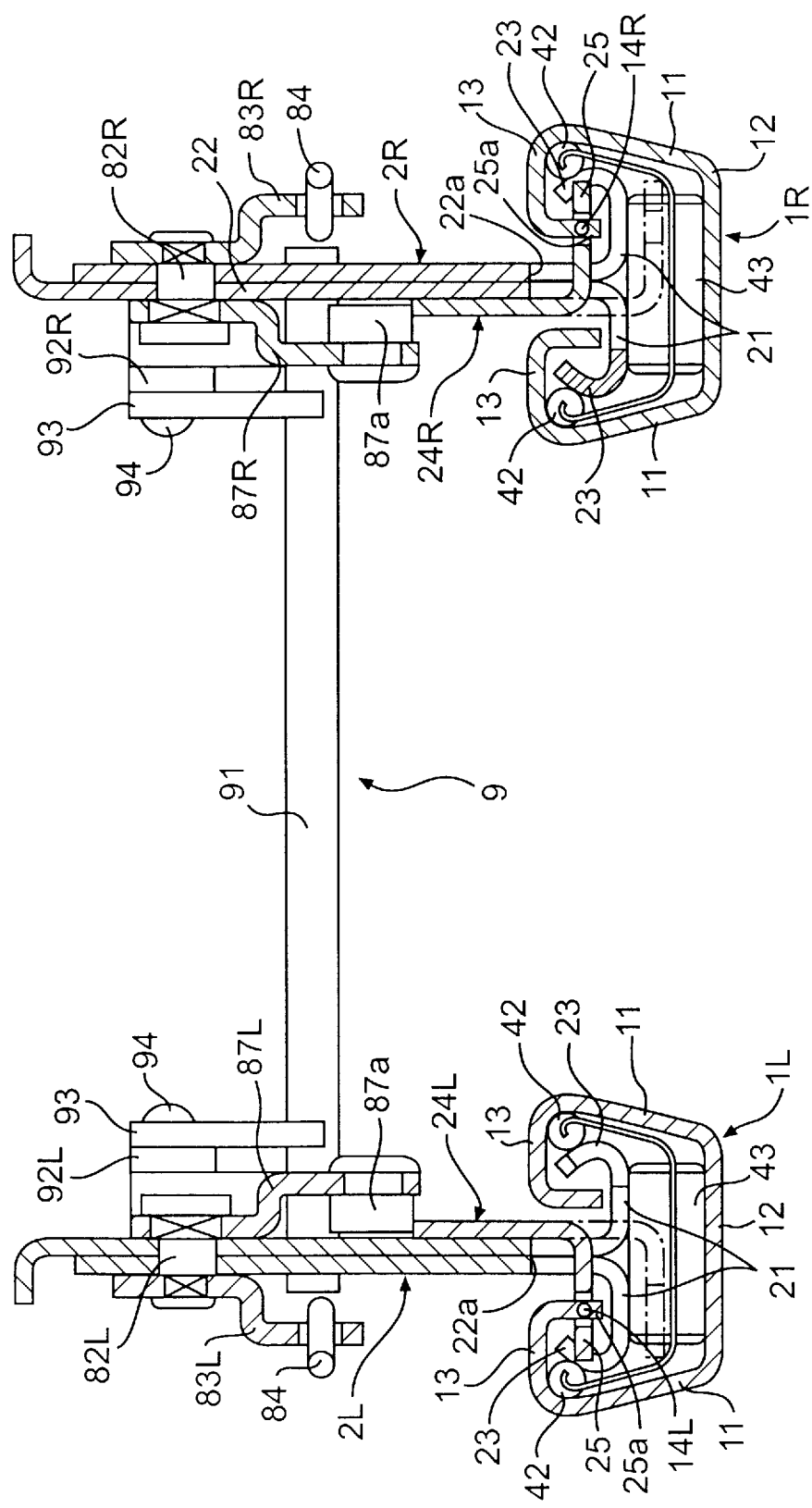
FIG. 3 is a cross-sectional view of a sliding mechanism according to the present invention.

As shown in FIGS. 1–3, the lower rails 1L, 1R are arranged in parallel with each other and extend in the forward and rearward direction of the vehicle. The lower rails 1L, 1R are shaped in U cross-sectional shape and have a pair of side walls 11 and a bottom wall 12 which is connected between the side walls 11. A pair of engaged walls 13 are formed at the upper ends of the side walls 11. The engaged walls 13 are extended to the inner direction of the lower rails 1L,1R and oppositely spaced from each other.

The upper rails 2L,2R are slidably supported on the lower rails 1L,1R and extend in the forward and rearward direction of the vehicle. The upper rails 2L,2R are shaped in reversed T cross-sectional shape and have a horizontal wall 21 and a vertical wall 22. A pair of engaged flange walls 23 is formed at both ends of the horizontal wall 21. The engaged flange walls 23 are extended to the upper direction of the upper rails 2L,2R.

The horizontal wall 21 of the upper rail 2L,2R is arranged between the two side walls 11 of the lower rails 1L,1R so as to be oppositely spaced from the bottom wall 12 of each of the lower rails 1L,1R The vertical wall 22 of the upper rail 2L,2R passes between the engaged walls 13 so as to extend in the upper direction. The flange walls 23 of the upper rails 2L,2R are engaged with the engaged walls 13 of the lower rails 1L,1R through balls 42. Rollers 43 are arranged between the horizontal wall 21 and the bottom wall 12.

A pair of notches 14L,14R are formed at one of the engaged walls 13 of the lower rails 1L,1R and spaced along the longitudinal direction of the lower rails 1L,1R. An opening 22a is formed in the upper rails 2L,2R. A pair of locking plates 24L,24R are rotatably supported on the vertical wall 22 of the upper rails 2L,2R by a pin 27. A flange 25 is formed at one end of the locking plates 24L,24R. The flange 25 passes through the opening 22a so as to oppose the notches 14L,14R. The engaged hole 25a formed in the flange 25 of the locking plates 24L,24R engages and disengages with the notches 14L,14R by a rotation of the locking plates 24L,24R. An attaching portion 26 is formed in the other end of the locking plates 24L,24R. An operative handle 44 is arranged with a front lower portion of the seat cushion 31. One end 44a of the operative handle 44 is attached to the attaching portion 26 of the locking plate 24R. The other end 44b of the operative handle 44 is attached to the attaching portion 26 of the locking plate 24L. The locking plates 24L,24R are pressed by a spring (not shown) so that the engaged hole 25a of the locking plates 24L,24R which are supported on the upper rails 2L,2R is engaged, the notches 14L,14R of the rails 1L,1R. Therefore, a sliding movement of the upper rails 2L,2R which are secured to the seat cushion 31 of the front seat 3 are restricted relative to the lower rails 1L,1R which are secured to the vehicle floor 4.

When the operative handle 44 operates, the locking plates 24L,24R are rotated against the spring. Therefore, the engaged hole 25a of the locking plates 24L,24R is disengaged from the notches 14L,14R. As a result, a sliding movement of the upper rails 2L,2R which are secured to the seat cushion 31 of the front seat 3 are achieved relative to the lower rails 1L,1R which are secured to the vehicle floor 4.

Figure 4:
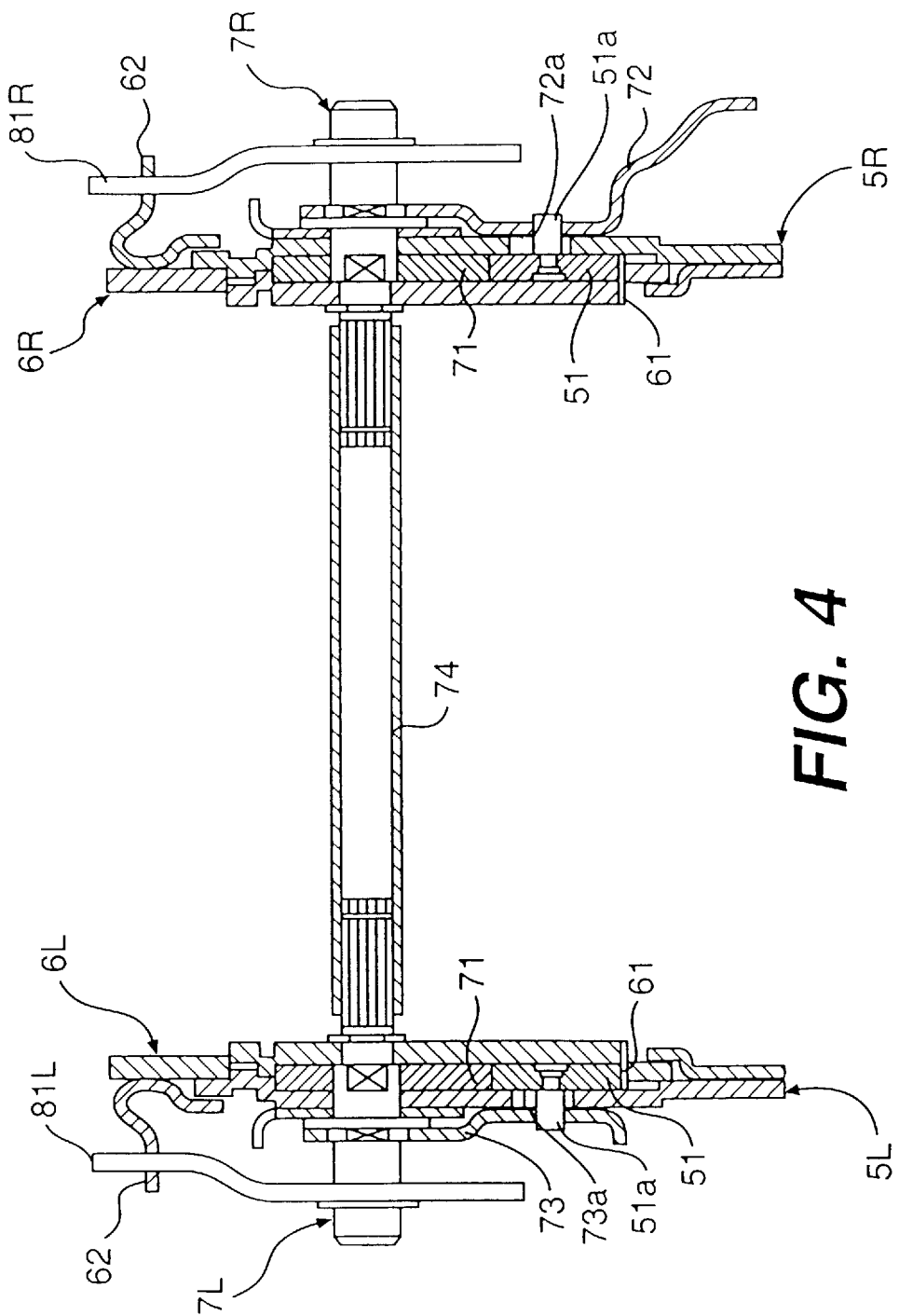
FIG. 4 is a cross-sectional view of a reclining mechanism according to the present invention.
Figure 4A:
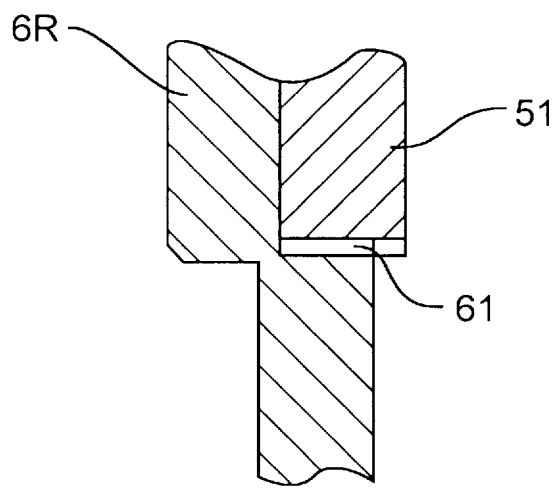
FIG. 4a is an enlarged view of one portion of FIG. 4.
Figure 5:
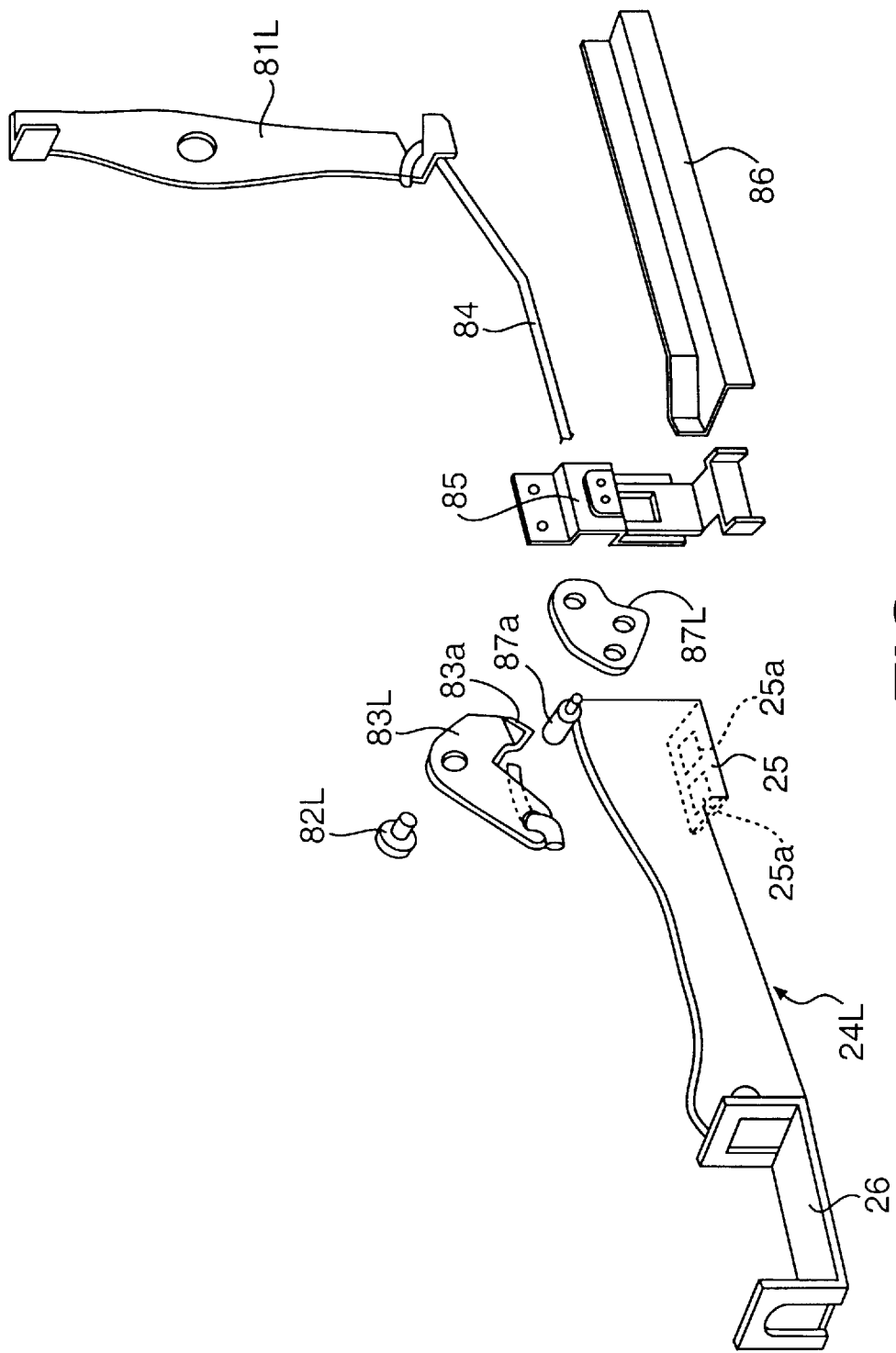
FIG. 5 is an exploded perspective view of a walk-in apparatus according to the present invention.
Figure 6:
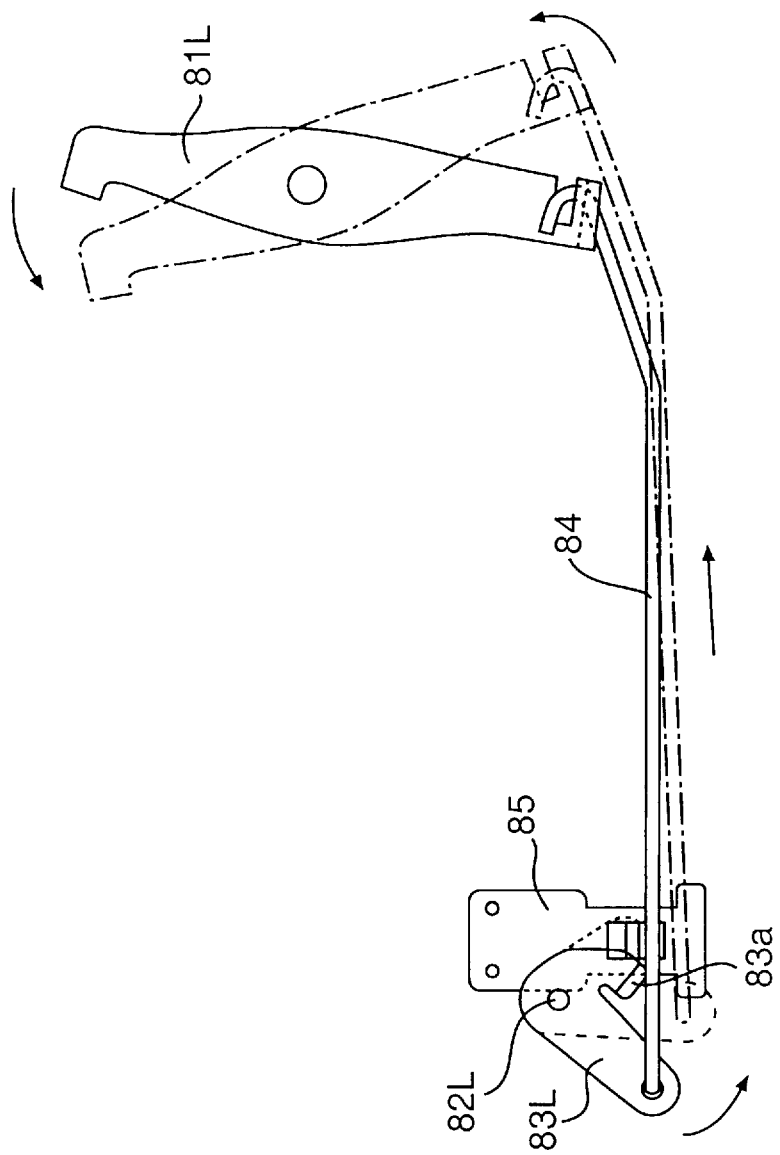
FIG. 6 is a plan view of a lever member of a walk-in apparatus according to the present invention.

Shown in FIGS. 1, 2 and 4, the lower arms 5L,5R are secured to the vertical wall 22 of the upper rails 2L,2R in parallel with each other. The upper arms 6L,6R are secured to the lower side surface of the seat back 32 and rotatably supported to the lower rams 5L,5R. A pair of rotating pins 7L,7R are rotatably supported on the lower arms 5L,5R and the upper arm 6L,6R (as shown in FIG. 4a). A ratchet 61 is formed in the upper arms 6L,6R. The ratchet 61 is shaped in an arc shape center of the rotating pins 7L,7R. A pawl 51 is slidably supported on the lower arms 5L,5R and engages and disengages with the ratchet 61. A cam member 71 is fixed to the rotating pins 7L,7R and contacts to the pawl 51. The contact between the cam member 71 and the pawl 51 slides to the pawl 51 toward the ratchet 61. Therefore, the pawl 51 is engaged with the ratchet 61. As a result, the rotation of the upper arms 6L,6R which are secured to the seat back 32 are restricted relative to the lower arms 5L,5R which are secured to the seat cushion 31 through the upper rails 2L,2R. An operative lever 72 is fixed to the rotating pin 7R. A lever 73 is fixed to the rotating pin 7L. A connecting pipe 74 is connected between both the rotating pins 7L,7R so as to integrally rotate together. An oblong hole 72a is formed in the operating lever 72. A oblong hole 73a is formed in the lever 73. A pin 51a is fixed to the pawl 51 and passes through the oblong holes 72a,73a.

When the operative lever 72 operates, the rotating pins 7L,7R rotate. Therefore, the contact of the pawl 51 and the cam member 71 is released. Also, the pawl 51 is disengaged from the ratchet 61. As a result, the rotation of the upper arms 6L,6R which are secured to the seat back 32 are achieved relative to the lower arms 5L,5R which are secured to the seat cushion 31 through the upper arms 2L,2R.

As shown in FIGS. 2–6, a pair of reclining plates 81L,81R are rotatably supported to the rotating pins 7L,7R. A pair of pins 82R,82L are rotatably supported to the vertical wall 22 of the upper rail 2L,2R. A bracket 62 is fixed to the upper arms 6L,6R. When the upper arms 6L,6R rotate toward the forward direction more than a predetermined rotation angle, the reclining plates 81L,81R contact the bracket 62. A pair of connecting levers 83L,83R are fixed to one end of the pins 82L,82R. The connecting levers 83L,83R are connected to the reclining plates 81L,81R through a rod 84. An engaged portion 83a is formed in one of the connecting levers 83L. A memory plate 85 is supported on the vertical wall 22 of one of the upper rails 2L and engages and disengages with the engaged portion 83a of one of the connecting levers 83L. The memory plate 85 is deformable at the width direction of the front seat 3. When the connecting lever 83L rotates more than a predetermined rotation angle, the engaged portion 83a is engaged with the memory plate 85. A release plate 86 is fixed to one of the lower rails 1L and contactable with the memory plate 85. When the memory plate 85 contacts by the rearward slide movement of the upper rails 2L,2R, the memory plate 85 is disengaged from the engaged portion 83a of the connecting lever 83L by the deformation of the memory plate 85. A pair of pressure levers 87L,87R are fixed to the pins 82R,82L. A pressure pin 87a is fixed to the pressure levers 87L,87R. The pressure pin 87a presses the locking plates 24L,24R by the rotation of the pressure levers 87L,87R so that the engaged hole 25a of the locking plates 24L,24R is disengaged from the notches 14L,14R of the lower rails 1L,1R.

Figure 7:
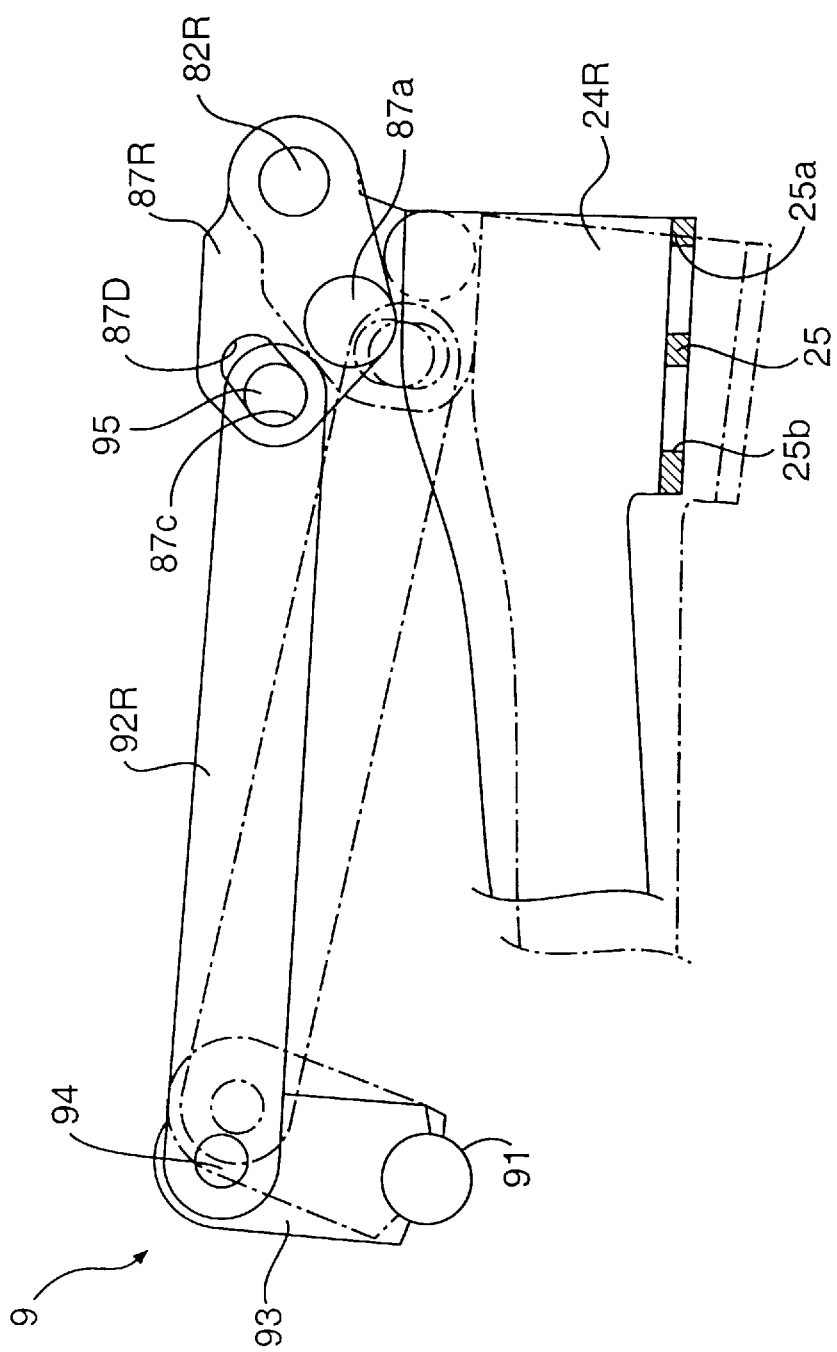
FIG. 7 is an enlarged plan view of a connecting portion between a pressure lever and a link of a walk-in apparatus according to the present invention.

As shown in FIGS. 2, 3 and 7, a connecting member 9 is connected between the pressure levers 87L,87R. The connecting member includes a rotating shaft 91 and a pair of connecting links 92L,93R. The rotating shaft 91 is arranged in the front lower portion of the seat cushion 31 and rotatably supported on the vertical wall 22 of the upper rails 2R,2L at both ends thereof. The connecting links 92L,92R are forwardly and rearwardly slidably arranged between the pressure levers 87L,87R and the rotating shaft 91. One end of each of the connecting links 92L,92R is connected to the rotating shaft 91 through a bracket 93 which is fixed to the rotating shaft 91 by a pin 94. The other end of each of the connecting links 92L,92R is connected to the pressure levers 87L,87R. An oblong hole 87b is formed in the pressure levers 87L,87R. A pin 95 is fixed to the other end of the connecting links 92L,92R. The pin 95 passes through the oblong hole 87b. The pin 95 is slidably arranged relative to the oblong hole 87b. When the engaged hole 25a engages with the notches 14L,14R, the pin 95 is contacted with one end 87c of the oblong hole 87b. Also, the oblong hole 87b is extended in the forward and rearward direction. Therefore, when the rotating shaft 91 rotates, the pin 95 slides into the oblong hole 87b. As a result, the rotation of the rotating shaft 91 does not communicate with the pressure levers 87L,87R through the connecting links 92L,92R. When the engaged hole 25a disengages from the notches 14L,14R, the oblong hole 87b is extended in the upward and downward direction. Therefore, when the rotating shaft 91 rotates, the pin 95, does not sledis relative to the oblong hole 87b. As a result, the rotation of the rotating shaft 91 is communicated with the pressure levers 87L,87R through the connecting links 92L,92R.

When the seat back 32 forwardly rotates more than the predetermined rotation angle, the reclining plates 81L,81R rotate by the contact between the bracket 62 and the reclining plates 81L,81R. The rod 84 slides in the rearward direction by the rotation of the reclining plates 81L,81R and the connecting levers 83L,83R, and pins 82L,82R and the pressure levers 87L,87R rotate. Therefore, the pressure pin 87a presses the locking plate 24L,24R by the rotation of the pressure levers 87L,87R and the locking plates 24L,24R rotate against the spring. As a result, the engaged hole 25a of the locking plates 24L,24R is disengaged from the notches 14L,14R and the front seat 3 forwardly slides. At this time, engaged portion 83a of one of the connecting levers 83L is engaged with the memory plate 85. Therefore, one of the connecting levers 83L, pin 82L and the pressure lever 87L are held so that the pressure pin 87a presses one of the locking plates 24L One of the connecting lever 83L, pin 82L and the pressure lever 87L are communicated with the connecting lever 83R, pin 82R and the pressure lever 87R through the connecting member 9. Therefore, the connecting lever 83R, pin 82R and the pressure lever 87R are held so that the pressure pin 87a presses the other of the locking plates 24R.

When the seat back 32 rearwardly rotates and the front seat 3 rearwardly slides, the reclining plates 81L,81R come out form the bracket 62 of the upper arms 6L,6R and the engaged portion 83a of one of the connecting levers 83L is disengaged from the memory plate 85 by the contact between the release plate 86 and the memory plate 85. Therefore, the rotation of the connecting levers 83L,83R, pins 82L,82R and the pressure levers 87L,87R is achieved. As a result, the engaged hole 25a of the locking plates 24L,24R is engaged with the notches 14L,14R by the rotation of the locking 24L,24R.

The preferred embodiment described herein is therefore illustrative and not restrictive, the scope of the invention being indicated in the appended claims, and all variations which come within the meaning of the claims are intended be embraced therein.

What is claimed is:

1. A walk-in apparatus for a vehicle seat which is forwardly and rearwardly slidably supported on a vehicle floor and includes a seat cushion and a seat back which is forwardly and rearwardly rotatably supported on the seat cushion comprising:

lower supports attachable to the vehicle floor;

upper supports slidably engaged with the lower supports and attached to the vehicle seat;

locking plates arranged on the upper supports and selectively engageable with the lower supports for restricting a sliding movement of the vehicle seat;

reclining plates arranged on opposite sides of the vehicle seat and rotated by a forward rotating movement of the seat back;

lever members arranged on opposite sides of the vehicle seat and connected to the locking plates and the reclining plates;

a connecting member connected to each of the lever members so as to be integrally movable with the lever members; and a memory plate engaging and disengaging with only one of the lever members.

2. A walk-in apparatus according to claim 1, wherein the lever members include a pressure lever rotatably supported on the seat cushion and contactable to the locking plates and a connecting lever rotatably supported on the seat cushion and connected to the reclining plates through a rod, the connecting lever having an engaged portion which engages and disengages with the memory plate.

3. A walk-in apparatus according to claim 1, wherein the connecting member includes a rotating shaft arranged proximate a front lower portion of the seat cushion and a pair of links connected to the rotating shaft and the lever members.

4. A walk-in apparatus according to claim 1, wherein the lever members include a pressure lever rotatably supported on the seat cushion and contactable with the locking plates, and a connecting lever rotatably supported on the seat cushion and connected to the reclining plates through a rod, the connecting lever having an engaged portion which engages and disengages with the memory plate; and the connecting member including a rotating shaft arranged proximate a front lower portion of the seat cushion and a pair of links connected to the rotating shaft and the pressure lever, one end of the links having a pin, and the pressure levers having oblong holes which receive the pin of the links.

* * * * *